US012754027B2

(12) United States Patent
Watanabe et al.

(10) Patent No.: US 12,754,027 B2
(45) Date of Patent: Oct. 6, 2026

(54) GUIDANCE APPARATUS, GUIDANCE METHOD, AND NON-TRANSITORY COMPUTER READABLE MEDIUM

(71) Applicant: TOYOTA JIDOSHA KABUSHIKI KAISHA, Toyota (JP)

(72) Inventors: Kohei Watanabe, Tokyo-to (JP); Shinya Hirosawa, Nisshin (JP); Ryusaku Yamamoto, Tokyo-to (JP); Takehira Ota, Inazawa (JP); Yuto Kaida, Nagoya (JP); Shintaro Matsutani, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 18/929,055

(22) Filed: Oct. 28, 2024

(65) Prior Publication Data

US 2025/0137791 A1 May 1, 2025

(30) Foreign Application Priority Data

Nov. 1, 2023 (JP) ................................ 2023-188019

(51) Int. Cl.
*G01C 21/34* (2006.01)
*G01C 21/36* (2006.01)

(52) U.S. Cl.
CPC ..... *G01C 21/3469* (2013.01); *G01C 21/3632* (2013.01); *G01C 21/367* (2013.01); *G01C 21/3682* (2013.01)

(58) Field of Classification Search
CPC ...... B60L 53/66; B60L 58/14; B60L 2250/16; B60L 2260/52; B60L 2260/55;
(Continued)

(56) References Cited

U.S. PATENT DOCUMENTS 11,920,940 B2 * 3/2024 Cun ........................ B60L 53/11
11,953,336 B2 * 4/2024 Song ....................... B60L 58/13
(Continued)

FOREIGN PATENT DOCUMENTS

JP 2003-262525 A 9/2003
JP 2006-331405 A 12/2006
(Continued)

*Primary Examiner* — Hai H Huynh
*Assistant Examiner* — Johnny H Hoang
(74) *Attorney, Agent, or Firm* — Dinsmore & Shohl LLP

(57) ABSTRACT

A guidance apparatus is for guidance to a charging facility and includes a positional information acquisition interface, a display and a controller. The positional information acquisition interface is configured to acquire information on the current position of a mobile object. The display is configured to display the charging facility. The controller is configured to extract a charging facility located within an area based on the current position, predict a recovery amount of a state of charge of a battery of the mobile object, expressed as a charging rate relative to a full charge of the battery, in a case in which the battery is charged at the charging facility for a predetermined charging time, and vary a display form of the charging facility displayed on a map image, according to a predicted value of the recovery amount of the state of charge.

20 Claims, 8 Drawing Sheets

(58) Field of Classification Search
CPC .......... B60L 2240/655; G01C 21/3469; G01C 21/3632; G01C 21/3682; G01C 21/367
USPC .......................................................... 701/123
See application file for complete search history.

(56) References Cited

U.S. PATENT DOCUMENTS

| | | | | |
|---|---|---|---|---|
| 12,351,065 | B2 * | 7/2025 | Choi | B60L 58/13 |
| 2010/0169008 | A1 | 7/2010 | Niwa et al. | |
| 2011/0246061 | A1 * | 10/2011 | Hayashi | G01C 21/3469 701/533 |
| 2014/0163877 | A1 * | 6/2014 | Kiyama | G01C 21/3469 701/533 |
| 2018/0045533 | A1 * | 2/2018 | Jackson | G01C 21/3682 |
| 2020/0101860 | A1 | 4/2020 | Ichikawa | |
| 2021/0142411 | A1 * | 5/2021 | Forbes, Jr. | B60L 53/305 |
| 2022/0258629 | A1 * | 8/2022 | Hanchett | B60L 53/16 |
| 2023/0045214 | A1 * | 2/2023 | Maeda | B60L 53/64 |
| 2023/0066396 | A1 * | 3/2023 | Lee | B60L 1/02 |
| 2023/0339360 | A1 * | 10/2023 | Kobashi | B60L 58/12 |
| 2024/0142247 | A1 * | 5/2024 | Ropel | B60L 58/13 |

FOREIGN PATENT DOCUMENTS

| | | | |
|---|---|---|---|
| JP | 2008-309544 | A | 12/2008 |
| JP | 2009-030993 | A | 2/2009 |
| JP | 2011-193547 | A | 9/2011 |
| JP | 2013-234924 | A | 11/2013 |
| JP | 2020-054180 | A | 4/2020 |
| JP | 6699644 | B2 | 5/2020 |
| JP | 2021-015087 | A | 2/2021 |

* cited by examiner

FIG. 4

| CHARGING FACILITY ID | MAXIMUM CHARGING TIME | CHARGING OUTPUT | CHARGING STANDARD | USAGE RESTRICTIONS | PAYMENT METHODS | RESERVATION REQUIREMENT |
|---|---|---|---|---|---|---|
| No. 000001 | 30 MINUTES | 20kW | STANDARD X | NONE | CASH<br>CREDIT<br>DEBIT | UNNECESSARY |
| No. 000002 | 20 MINUTES | 50kW | STANDARD Y | MEMBERS ONLY | CASH<br>SPECIAL<br>CARD | REQUIRED |
| ... | ... | ... | ... | ... | ... | ... |

GUIDANCE APPARATUS, GUIDANCE METHOD, AND NON-TRANSITORY COMPUTER READABLE MEDIUM

CROSS-REFERENCE TO RELATED APPLICATION

This application claims priority to Japanese Patent Application No. 2023-188019, filed on Nov. 1, 2023, the entire contents of which are incorporated herein by reference.

TECHNICAL FIELD

The present disclosure relates to a guidance apparatus, a guidance method, and a program for guidance to a charging facility.

BACKGROUND

A navigation apparatus that displays charging information so that a user using a vehicle during the day can easily select a charging facility for charging the vehicle's electrical energy storage mechanism has been proposed. See, for example, Patent Literature (PTL) 1.

CITATION LIST

Patent Literature

PTL 1: JP 2009-030993 A

SUMMARY

However, in a conventional system that guides users to charging facilities, it is difficult for users visually to grasp the recovery amount of the battery state of charge in the case of using each charging facility.

It would be helpful to make it possible to grasp the recovery amount of the battery state of charge visually in the case of using each charging facility.

A guidance apparatus according to an embodiment of the present disclosure is a guidance apparatus for guidance to a charging facility, the guidance apparatus including:

- a positional information acquisition interface configured to acquire information on a current position of a mobile object;
- a display configured to display the charging facility; and
- a controller configured to extract a charging facility located within an area based on the current position, predict a recovery amount of a state of charge of a battery of the mobile object, expressed as a charging rate relative to a full charge of the battery, in a case in which the battery is charged at the charging facility for a predetermined charging time, and vary a display form of the charging facility displayed on the display, according to a predicted value of the recovery amount of the state of charge.

A guidance method according to an embodiment of the present disclosure is a guidance method to be executed by a controller of a guidance apparatus for guidance to a charging facility, the guidance method including:

- acquiring information on a current position of a mobile object;
- extracting a charging facility located within an area based on the current position;
- predicting a recovery amount of a state of charge of a battery of the mobile object, expressed as a charging rate relative to a full charge of the battery, in a case in which the battery is charged at the charging facility for a predetermined charging time; and
- causing a display to display the charging facility while varying a display form of the charging facility according to a predicted value of the recovery amount of the state of charge.

A program according to an embodiment of the present disclosure is configured to cause a computer to execute processing, the processing including:

- acquiring information on a current position of a mobile object;
- extracting a charging facility located within an area based on the current position;
- predicting a recovery amount of a state of charge of a battery of the mobile object, expressed as a charging rate relative to a full charge of the battery, in a case in which the battery is charged at the charging facility for a predetermined charging time; and
- causing a display to display the charging facility while varying a display form of the charging facility according to a predicted value of the recovery amount of the state of charge.

According to the present disclosure, the recovery amount of the battery state of charge can be grasped visually in the case of using each charging facility.

BRIEF DESCRIPTION OF THE DRAWINGS

In the accompanying drawings:

FIG. 4 is a diagram illustrating an example of information, on charging facilities, stored in a server memory of FIG. 3;

DETAILED DESCRIPTION

An embodiment of the present disclosure will be described below, with reference to the drawings. The drawings used in the following description are schematic. Dimensional ratios or the like on the drawings do not necessarily match actual ones.

Guidance System

Figure 1:
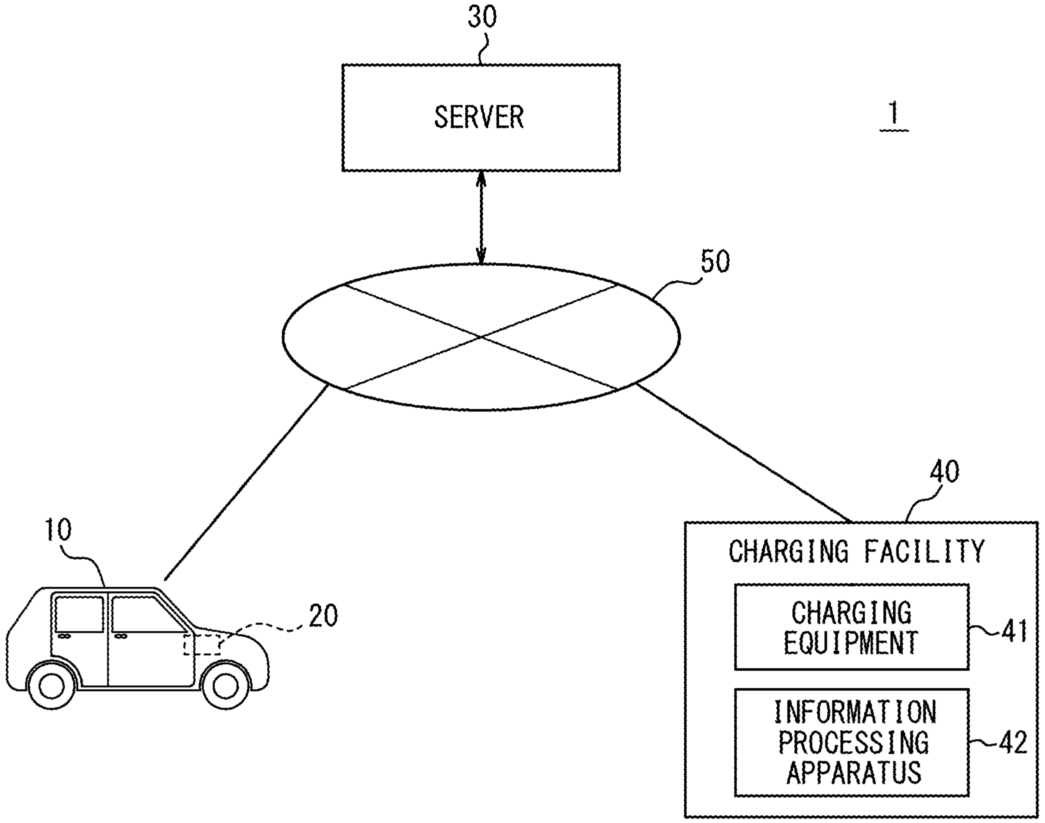
FIG. 1 is a block diagram illustrating a schematic configuration of a guidance system including a guidance apparatus according to an embodiment.

FIG. 1 illustrates a guidance system 1 including a guidance apparatus 20 according to an embodiment of the present disclosure. The guidance system 1 is configured to include a vehicle 10, a guidance apparatus 20 mounted on the vehicle 10, and a server 30. The guidance apparatus 20 and the server 30 can transmit and receive information to and from each other via a communication network 50. The communication network 50 includes the Internet, at least one wide area network (WAN), at least one metropolitan area network (MAN), or any combination thereof.

The guidance system 1 may further include a charging facility 40 in a case in which an information processing apparatus 42 included in the charging facility 40 is capable of transmitting information to the guidance apparatus 20 or the server 30. Although only one vehicle 10, guidance apparatus 20, and charging facility 40 are depicted in FIG. 1, there may be many vehicles 10, guidance apparatuses 20, and charging facilities 40.

The guidance system 1 is a system that displays the recovery amount of the battery state of charge in a case of using each charging facility 40 to the user of the vehicle 10 so that the user of the vehicle 10 can visually grasp the recovery amount in order to select a charging facility 40 for charging the battery. The guidance apparatus 20 is located in the vehicle 10 and has the function of displaying the charging facility 40 to the user. Each component of the guidance system 1 is described below.

Configuration of Vehicle

Figure 2:
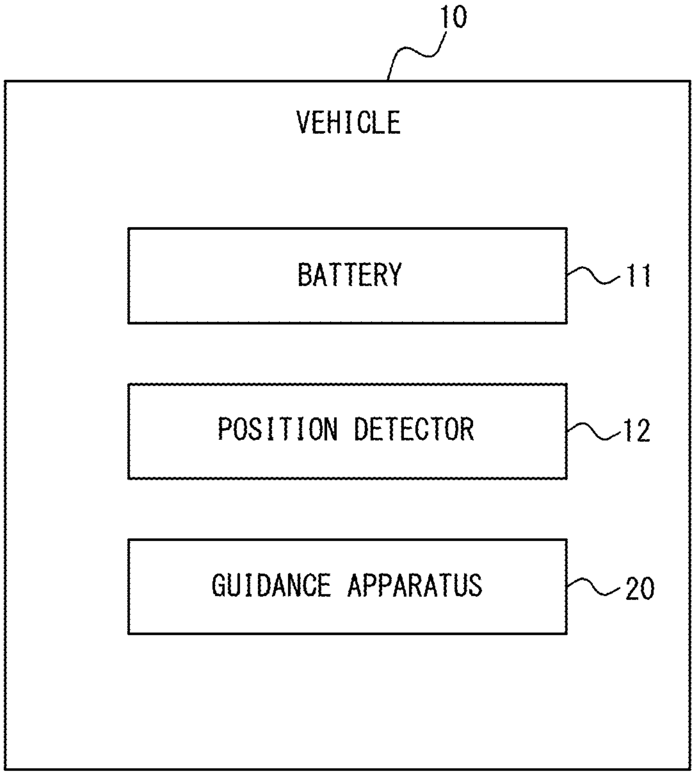
FIG. 2 is a block diagram schematically illustrating a configuration of a vehicle in FIG. 1.

The vehicle 10 in the present disclosure is an electric vehicle, such as a Battery Electric Vehicle (BEV) or Plug-in Hybrid Electric Vehicle (PHEV), that is powered by electricity. The vehicle 10 is, for example, a passenger car but is not limited to this example. Other examples may include trucks, buses, or special vehicles. The vehicle 10 includes a battery 11 and a position detector 12 in addition to the guidance apparatus 20, as illustrated in FIG. 2. The vehicle 10 is included among mobile objects. Mobile objects are not limited to the vehicle 10. For example, apart from the vehicle 10, mobile objects may include a flying object that is powered by electric power and is manned.

The battery 11 stores electric power for driving the vehicle 10. The battery 11 is configured to include a secondary battery that can be repeatedly charged and discharged, such as a lithium ion secondary battery or a nickel metal hydride secondary battery. The battery 11 may use other energy storage apparatuses, such as a multilayer capacitor, instead of a secondary battery. The battery 11 includes a Battery Management System (BMS) that controls the charging and discharging of electric power. The BMS can calculate the State of Charge (SOC) of the battery 11. The state of charge is calculated by, for example, the open circuit voltage of the battery 11 or by accumulating the charging current to the battery 11. The battery 11 may be located anywhere, such as under the rear seat or in the trunk of the vehicle 10.

The position detector 12 detects the current position of the vehicle 10. The position detector 12 includes, for example, a Global Positioning System (GPS) receiver and can use signals from the GPS receiver to obtain information on the latitude and longitude of the current position of the vehicle 10. Instead of or in addition to the GPS receiver, a receiver compliant with a different Global Navigation Satellite System (GNSS) may be employed. In addition to signals from GPS receivers, signals from various detection apparatuses such as heading sensors, rudder angle sensors, and distance sensors may be used to identify the position.

Configuration of Server

Figure 3:
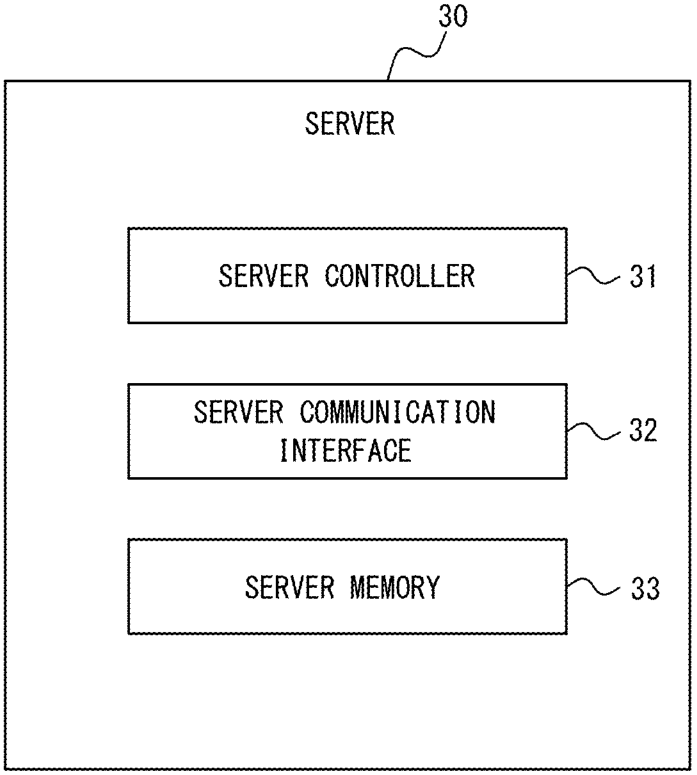
FIG. 3 is a block diagram illustrating a schematic configuration of a server in FIG. 1.

The server 30 is a computer that belongs to a cloud computing system or another type of computing system. The server 30 can collect information on the charging facility 40 and provide the information to the guidance apparatus 20. As illustrated in FIG. 3, the server 30 includes a server controller 31, a server communication interface 32, and a server memory 33.

The server controller 31 includes at least one processor, at least one programmable circuit, at least one dedicated circuit, or any combination thereof. The processor is a general purpose processor such as a central processing unit (CPU) or a graphics processing unit (GPU), or a dedicated processor that is dedicated to specific processing. The programmable circuit is, for example, a field-programmable gate array (FPGA). The dedicated circuit is, for example, an application specific integrated circuit (ASIC). The server controller 31 executes processing related to operations of the server 30 while controlling components of the server 30.

The server controller 31 acquires information on the charging facility 40 via the communication network 50. The server controller 31 can store the collected information on the charging facility 40 in the server memory 33. The server controller 31 can receive information requests from the guidance apparatus 20 via the server communication interface 32 and transmit information to the guidance apparatus 20.

The server communication interface 32 includes at least one interface for communication compliant with communication via a connection to the communication network 50. The interface for communication is compliant with, for example, a mobile communication standard, a wired LAN standard, or a wireless LAN standard, but is not limited to these, and may be compliant with any communication standard.

The server memory 33 includes at least one semiconductor memory, at least one magnetic memory, at least one optical memory, or any combination thereof. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The server memory 33 functions as, for example, a main memory, an auxiliary memory, or a cache memory. The server memory 33 stores data to be used for the operations of the server 30 and data obtained by the operations of the server 30. The server memory 33 may store a system program, an application program, information on the charging facilities 40, and the like.

The server memory 33 stores information about many charging facilities 40. The information on the charging facilities 40 includes positional information for each charging facility 40. For example, the positional information may include information on the latitude and longitude of the position of the charging facility 40. The positional information may also include information such as the roads adjacent to the charging facility 40 and the position of entrances where the vehicle 10 can enter.

Furthermore, the server memory 33 can store and manage various information about the charging facilities 40. For example, as illustrated in FIG. 4, the server memory 33 may store and manage identification information for each charging facility 40, and information on the maximum charging time, the charging output, and the charging standard of the charging equipment 41 included in the charging facility 40. The maximum charging time is the maximum value of the charging time available for a single charge with the charging equipment 41 and is set by the charging facility 40. The charging output is the maximum output that the charging equipment 41 can charge and indicates the capacity of the charging equipment 41. The unit of the charging output may be specified in amperes (A) instead of watts (W). The charging standards are the charging standards that the charging equipment 41 supports, examples of which include J1772, CHAdeMO, North American Charging Standard (NACS), GB/T, and Combined Charging System (CCS).

Furthermore, the server memory 33 can store and manage information on usage restrictions, payment methods, a reservation requirement, and the like for the charging facilities 40. The information on usage restrictions includes information on restrictions based, for example, on attributes of the users of the corresponding charging facility 40. For example, in a case in which the charging facility 40 can only be used by members of a particular service, such information is included in the usage restrictions. The payment methods indicate the payment methods available at the charging facility 40. Examples of the payment methods include cash, credit cards, debit cards, specific prepaid cards, and other online payment methods operated by specific businesses.

Configuration of Guidance Apparatus

Figure 5:
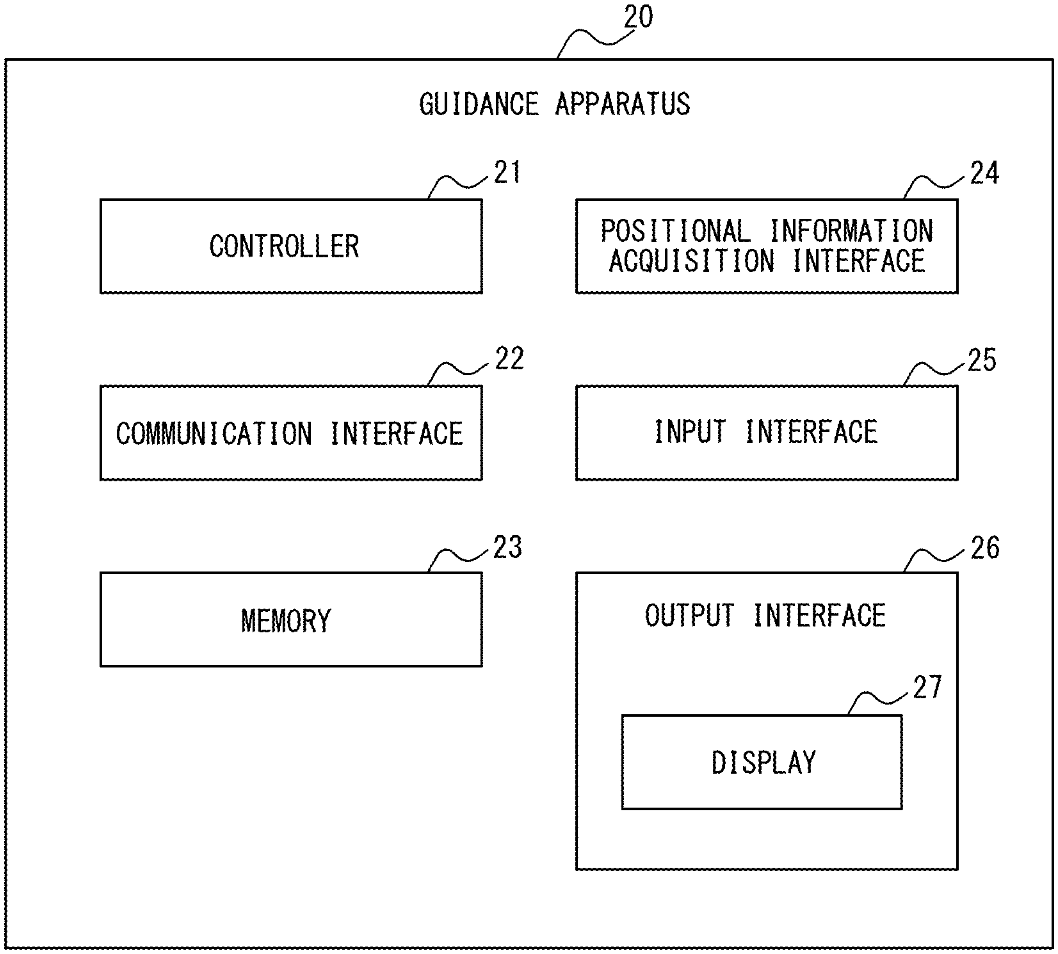
FIG. 5 is a block diagram illustrating a schematic configuration of the guidance apparatus in FIG. 1.

The guidance apparatus 20 is an information device mounted in the vehicle 10. The guidance apparatus 20 may, for example, use hardware common to a navigation system. The guidance apparatus 20 includes a controller 21, a communication interface 22, a memory 23, a positional information acquisition interface 24, an input interface 25, and an output interface 26, as illustrated in FIG. 5, for example.

Like the server controller 31, the controller 21 includes at least one processor, at least one programmable circuit, at least one dedicated circuit, or any combination thereof. The controller 21 executes processes related to the operations of the guidance apparatus 20 while controlling the components of the guidance apparatus 20.

Like the server communication interface 32, the communication interface 22 includes at least one interface for communication.

Like the server memory 33, the memory 23 includes at least one semiconductor memory, at least one magnetic memory, at least one optical memory, or any combination thereof. The memory 23 stores data to be used for operations of the guidance apparatus 20 and data obtained by the operations of the guidance apparatus 20. The memory 23 may store a system program, an application program, information acquired from the server memory 33 on the charging facilities 40, and the like.

The memory 23 may further store map information for displaying and providing guidance on the route to the charging facility 40. The guidance apparatus 20 may be configured to retrieve the map information stored by the memory 23 from the server 30 or a server of a generally available map information service when necessary.

The memory 23 may also store the amount of electrical energy when the battery 11 is fully charged. It is known that the amount of electrical energy of the fully charged battery 11 decreases with repeated charging and discharging of the battery 11. The controller 21 may acquire the current amount of electrical energy of a full charge from the battery control system (BMS) of the battery 11 and store the amount in the memory 23. Furthermore, the memory 23 may store the specifications of the battery 11 and the BMS installed in the vehicle 10. The memory 23 may hold the amount of charge per unit of time to the battery 11 based on the charge output of the charging equipment 41, the state of charge of the battery 11, and other information in table form or as a formula. Other conditions may, for example, include temperature, the specifications of the battery 11, and information on the state of aging of the battery 11. In a case in which the other conditions include temperature information, the guidance apparatus 20 either includes a temperature sensor or is configured to acquire, from the vehicle 10, the output of a temperature sensor provided in the vehicle 10.

Furthermore, the memory 23 may store charging standards for the vehicle 10 in which the guidance apparatus 20 is installed and user information about the user of the guidance apparatus 20. The user information may include information such as the membership-based charging service to which the user subscribes and the payment methods available to the user. The user information may be registered in advance by the user.

The positional information acquisition interface 24 acquires information on the current position of the vehicle 10 from the position detector 12 via the communication network in the vehicle 10. In other embodiments, the guidance apparatus 20 may include therein a sensor to detect the position. In this case, the sensor that detects the position is the positional information acquisition interface 24.

The input interface 25 includes at least one interface for input. The interface for input is, for example, a physical key such as a keyboard, a capacitive key, a pointing device, or a touch screen integrally provided with a display. The interface for input may be, for example, a microphone that accepts audio input, a camera that accepts image input, or the like. The input interface 25 accepts operations for inputting data to be used for respective operations of the guidance apparatus 20. Instead of being included in the guidance apparatus 20, the input interface 25 may be connected to the guidance apparatus 20 as an external input device. The user may be able to change various settings, such as the manner in which the charging facilities 40 are displayed on the display 27 and the number of charging facilities to be displayed, via the input interface 25.

The output interface 26 includes at least one interface for output. The interface for output includes the display 27. The display 27 is, for example, a display that outputs information in the form of video. The display is, for example, a Liquid Crystal Display (LCD), an organic Electro-Luminescence (EL) display, an inorganic EL display, or a Plasma Display Panel (PDP), but these examples are not limiting. The display 27 can display the charging facility 40 on a map image based on map information retrieved from the memory 23 under the control of the controller 21.

The output interface 26 further includes a speaker that outputs information in the form of audio. The output interface 26 outputs data received via the communication network 50, data obtained by the operations of the guidance apparatus 20, and the like.

Charging Facility

The charging facility 40 is a facility that provides charging services to the vehicle 10, which is an electric vehicle. As illustrated in FIG. 1, the charging facility 40 includes one or more pieces of charging equipment 41 (chargers) that charge the vehicle 10. The charging facilities 40 include facilities that place no limit on users and facilities that limit users, such as limiting to users with memberships. At the charging facility 40, the maximum charging time that charging can be performed using the charging equipment 41 may be specified.

The charging facility 40 may include an information processing apparatus 42 and may provide specifications of the charging services provided by the charging facility 40 to an external destination. The specifications of the charging services of the charging facility 40 may also be provided by other external information processing apparatuses.

The charging facility 40 may also include an information processing apparatus 42 and may provide the status of the charging service provided by the charging facility 40 to external apparatuses, including the server 30, in real time. The information processing apparatus 42 may support either or both push and pull type information provision methods. For example, the information processing apparatus 42 may provide the waiting time for the charging facility 40 to an external destination. For example, in a case in which the charging facility 40 changes the maximum charging time depending on how crowded the charging facility 40 is, such as shortening the maximum charging time when the charging facility 40 is crowded, the information processing apparatus 42 may be configured to transmit such information to an external destination. In a case in which, for some reason, the charging equipment 41 is unavailable or the charging output is low, the information processing apparatus 42 may transmit such information to an external destination. In some embodiments, the information processing apparatus 42 may be omitted from the charging facility 40.

Example of Display of Charging Facilities

Figure 6:
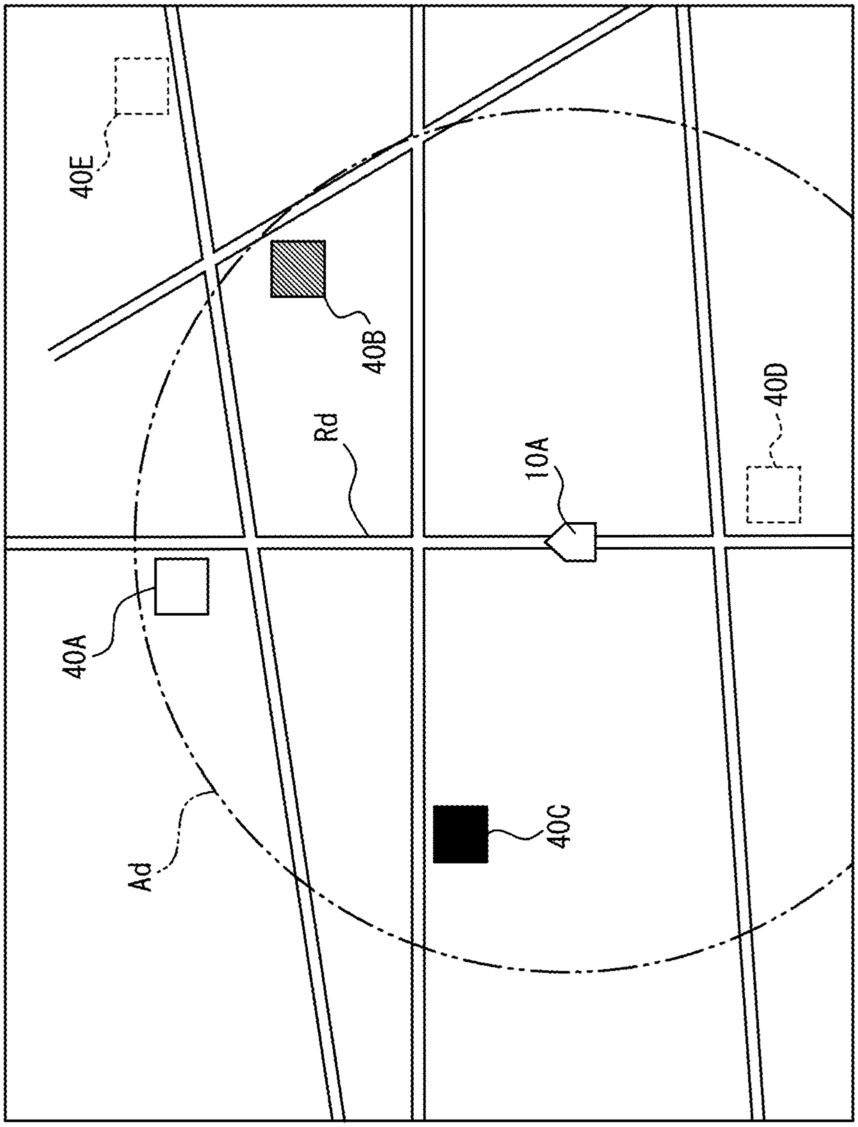
FIG. 6 is a diagram illustrating an example of an image, displayed on a display in FIG. 5, including charging facilities.

FIG. 6 is a diagram illustrating an example of charging facilities 40 displayed on the display 27. The display 27 may display the charging facilities 40 on a common image with the navigation system. The vehicle image 10A indicates a vehicle 10, displayed on the map image, that has the guidance apparatus 20 mounted thereon. As the vehicle 10 advances along the road Rd, the map image may scroll towards the bottom of FIG. 6. Charging facility images 40A to 40E are arranged on the map image and indicate a plurality of charging facilities 40 located near the vehicle 10. Some of the charging facility images 40A to 40E (for example, charging facility images 40D and 40E) might not be displayed, as described below. The charging facility images 40A to 40E may be displayed as icons that can be understood to be charging facilities 40. As a result of the charging facilities 40 being displayed by icons, the user can easily locate the charging facilities 40 on the map image.

To display the charging facilities 40 on the map image, the controller 21 of the guidance apparatus 20 determines a target area Ad based on the current position acquired from the positional information acquisition interface 24. The target area Ad can, for example, be the area inside a predetermined circumference centered on the current position. The controller 21 queries the server 30 and extracts the charging facilities 40 located within the target area Ad based on the positional information on each charging facility 40 stored in the server memory 33. In this way, the nearby charging facilities 40 that are located within a predetermined range from the current position of the vehicle 10 can be extracted. For example, in the example in FIG. 6, the charging facility image 40E corresponding to a charging facility 40 that is relatively far from the vehicle 10 is not subject to extraction and is not displayed, or is displayed in an inconspicuous manner. The controller 21 may acquire the information illustrated in FIG. 4 for the extracted charging facilities 40 from the server 30 and store the information in the memory 23. The target area Ad is not limited to a circular shape. For example, the target area Ad may be an ellipse with the direction of travel of the vehicle 10 as the direction of the major axis.

The controller 21 predicts the recovery amount of the state of charge of the battery 11 of the mobile object in a case in which the battery 11 is charged at each charging facility 40 for a predetermined charging time. The controller 21 can use a table or formula stored in the memory 23 to estimate the actual electrical energy to be charged when the vehicle 10 is connected to charging equipment 41 with a specific charging output, such as 50 kW output. The controller 21 can estimate the amount of electrical energy charged to the battery 11 by accumulating the electrical energy charged to the battery 11 over a predetermined amount of time.

The predetermined amount of time can be a time set by the user. This enables prediction of the recovery amount of the battery state of charge (SOC) in a case in which the battery 11 is charged according to the user's schedule.

The predetermined amount of time can be the maximum charging time, which is the upper limit of the charging time for each charging facility 40. This enables prediction of the recovery amount of the battery state of charge (SOC) in a case of performing the maximum charging at each charging facility 40.

The controller 21 can predict the recovery amount of the state of charge of the battery 11 taking into account the power consumption for travel of the vehicle 10 from the current position to each charging facility 40. In other words, in predicting the recovery amount of the state of charge, the controller 21 can subtract the amount of electrical energy that is predicted to be consumed for travel to a charging facility 40 from the amount of electrical energy that is predicted to be charged at that charging facility 40. In this way, the recovery amount of the state of charge after the actual travel to the charging facility 40 and completion of the charging can more accurately be predicted.

In an embodiment, the recovery amount of the state of charge (SOC) is expressed as a charging rate relative to a full charge of the battery 11. The controller 21 varies the display form of the charging facilities 40 displayed on the map image, according to the predicted value of the recovery amount of the state of charge (SOC). In an embodiment, the controller 21 classifies the predicted value of the recovery amount of the state of charge by setting one or more thresholds for the predicted value of the recovery amount and varies the display form. For example, the controller 21 may classify the recovery amount of the state of charge into three categories, such as 80% or more, 20% or more but less than 80%, and less than 20%, and vary the display colors of the charging facility images 40A to 40C, which indicate the respective charging facilities 40, to colors such as blue, yellow, and red, according to the respective categories. This configuration enables the user to grasp the predicted value of the recovery amount of the battery state of charge visually in the case of using each charging facility 40. In addition to changing the color of the charging facility images 40A to 40C, the controller 21 can also change the brightness and the flashing rate. In addition, when the predicted value of the recovery amount of the state of charge is classified by a threshold, it becomes easier for the user to grasp the differences in the predicted value of the recovery amount of the state of charge.

The controller 21 may cause the display 27 to display only those charging facilities 40 for which the predicted value of the recovery amount of the state of charge is equal to or greater than a predetermined value. For example, the controller 21 may refrain from displaying charging facilities 40 for which the predicted value of the recovery amount of the state of charge is less than 20%. In this way, the displayed map image is easier for the user to read, making it easier for the user to select a charging facility 40.

In an embodiment, the controller 21 may set a priority for the charging facilities 40 based on the current position of the vehicle 10 and the positional relationship with the road Rd on which the vehicle 10 is traveling, and may cause the display 27 preferentially to display charging facilities 40 for which the priority is higher. For example, the controller 21 causes the display 27 to display the charging facility images 40A to 40C of a predetermined number of charging facilities 40 in the target area Ad starting from the highest priority. For example, in a case in which the predetermined number is set to 3, the charging facility image 40D corresponding to the charging facility 40 which is fourth or later in order of priority is not displayed. In this way, the charging facilities 40 to be displayed to the user can be limited to facilitate user selection.

Figure 7:
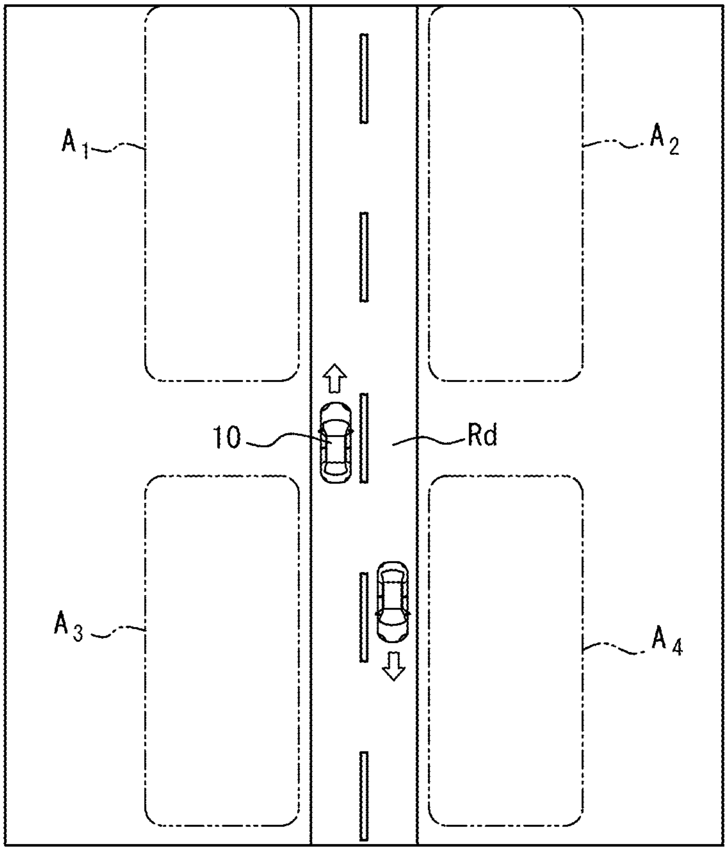
FIG. 7 is a diagram illustrating an example of a method for setting the priority of a charging facility based on the position of a vehicle and the positional relationship with the road on which the vehicle is traveling.

For example, on a road Rd that extends in a straight line as in FIG. 7, the priority of a charging facility 40 located in area $A_1$ in the direction of travel of the vehicle 10 on the traffic division side on which the vehicle 10 is traveling (the left side in FIG. 7) can be set high. The reason is that in such a case, the vehicle 10 can easily enter the charging facility 40. A charging facility 40 located in area $A_2$ in the direction of travel of the vehicle 10 on the opposite side (the right side in the figure) from the traffic division side on which the vehicle 10 is traveling has a lower priority than the charging facility 40 located in area $A_1$, since the vehicle 10 would need to cross the oncoming lane to enter. Furthermore, the priority of charging facilities 40 located in areas $A_3$ and $A_4$, which are on the opposite side from the direction of travel of the vehicle 10, is set even lower. The reason is that in such a case, the vehicle 10 would need to turn around on the road Rd to enter the charging facility 40.

Furthermore, the controller 21 may acquire information on the road structure from the map information stored in the memory 23 and determine the priority according to the acquired information on the road structure.

Figure 8:
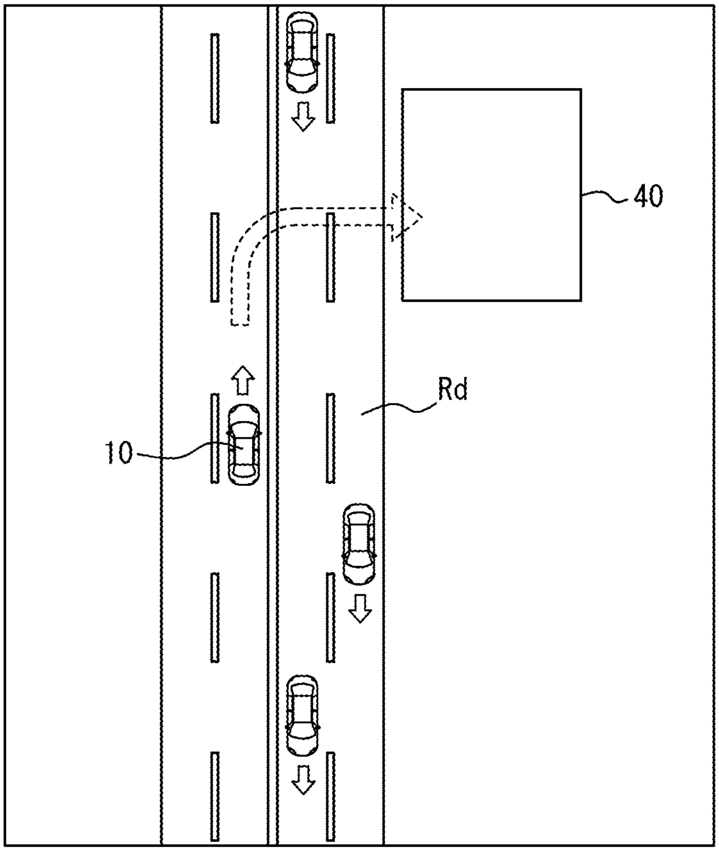
FIG. 8 is a diagram illustrating another example of a method for setting the priority of a charging facility based on the position of a vehicle and the positional relationship with the road on which the vehicle is traveling.

For example, as illustrated in FIG. 8, if the road Rd has two lanes in each direction, and a right turn must be made to enter the charging facility 40, the priority is lower than if the road Rd has one lane in each direction. Furthermore, if there is a median strip on the road Rd, the priority of the charging facility 40 is even lower, since the charging facility 40 cannot be entered by turning right.

The controller 21 may further acquire traffic information on the road Rd on which the vehicle 10 is traveling and determine the priority according to the traffic information. The traffic information can be acquired from a traffic information provider via the communication network 50. Traffic information providers include government agencies with jurisdiction over traffic management, road administrators, and businesses that provide traffic information.

The controller 21 may set a lower priority for charging facilities 40 along a route with a traffic jam based on traffic jam information on the road Rd included in the traffic information. On the road with two lanes in each direction illustrated in FIG. 8, it may be difficult for the vehicle 10 to turn right and enter the charging facility 40 in a case in which the oncoming lane is congested. Therefore, in such a case, the priority of the charging facility 40 may be set even lower. As described above, as a result of priority being set, charging facilities 40 that are easy for users to use are displayed on the map image on the display 27, thereby improving user convenience.

In an embodiment, the controller 21 extracts only charging facilities 40 that are available to the vehicle 10 and displays the charging facilities 40 on the display 27. This configuration prevents the vehicle 10 from going to a charging facility 40 that the vehicle 10 cannot use.

For example, the controller 21 confirms whether a charging standard of the charging facility 40 conforms to a charging standard of the vehicle 10 and causes the display 27 to display the charging facility 40 only in a case of conformity.

The controller also confirms whether an available payment method registered in advance by a user of the vehicle 10 is available for payment at the charging facility and causes the display 27 to display the charging facility 40 only in a case in which the payment method is available. The controller 21 determines the availability at the charging facility 40 by comparing the payment methods of the charging facility 40 stored in the memory 23 with the payment methods available to the user.

As explained above, according to the present embodiment, the user can visually grasp, on the map image displayed on the display 27, the recovery amount of the state of charge of the battery in a case of using each charging facility 40. Furthermore, the charging facilities 40 to be displayed are selected based on factors such as user convenience and availability, thereby facilitating user selection of a charging facility 40.

Procedures for Guidance to Charging Facilities

Figure 9:
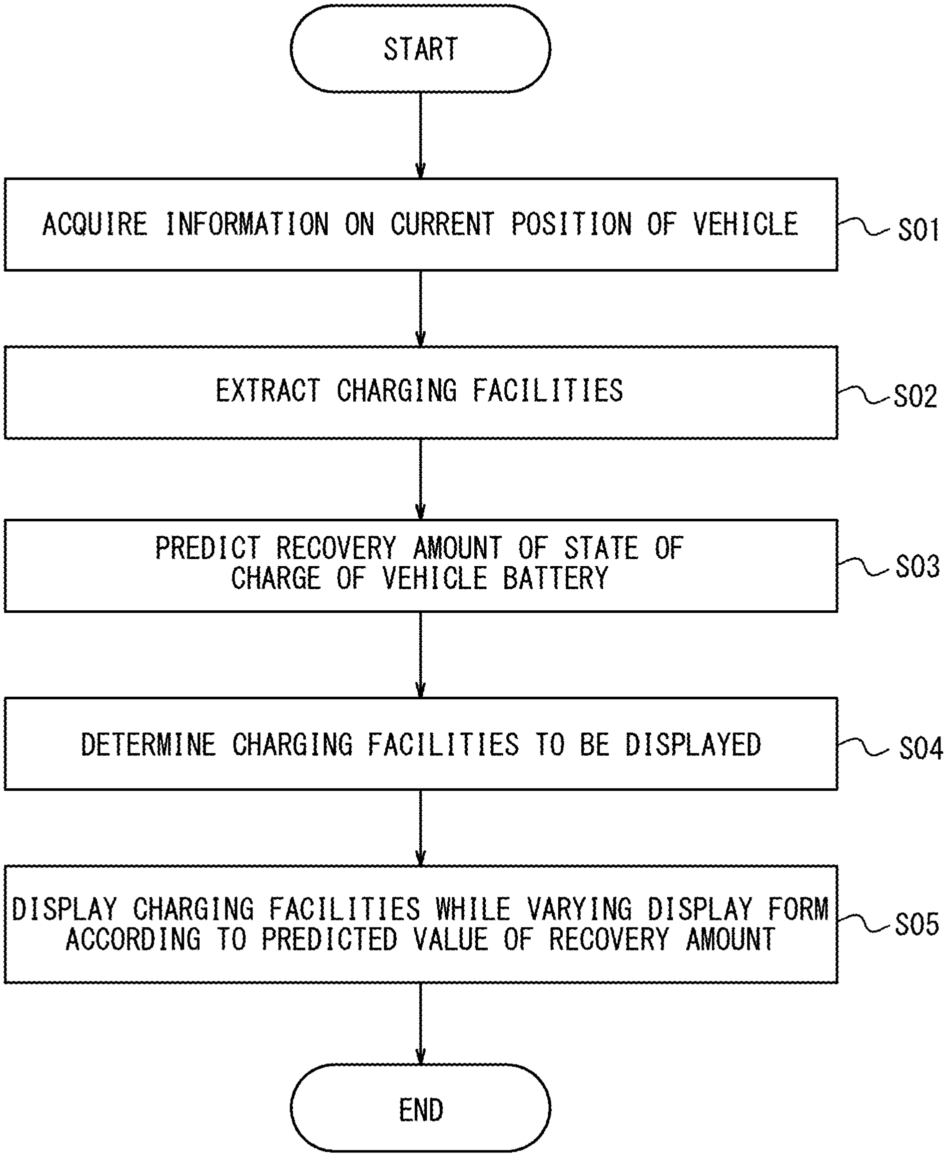
FIG. 9 is a flowchart illustrating example processing executed by a controller of the guidance apparatus.

Next, processing executed by the controller 21 of the guidance apparatus 20 will be described based on the flowchart in FIG. 9. The flowchart in FIG. 9 corresponds to a method, performed by the controller 21, of the present disclosure for guidance to the charging facility 40. The guidance method disclosed herein can be performed according to a program by a processor included in the controller 21. Such a program may be stored in a non-transitory computer readable medium. Examples of non-transitory computer readable media may include, but are not limited to, a hard disk, RAM, ROM, flash memory, a CD-ROM, an optical storage device, and a magnetic storage device.

The controller 21 acquires information on the current position of the vehicle 10 from the positional information acquisition interface 24 (S01).

The controller 21 extracts charging facilities 40 located within an area based on the current position of the vehicle 10 (S02).

The controller 21 predicts the recovery amount of the state of charge of the battery 11 of the vehicle 10 in a case in which the battery 11 is charged at the charging facilities 40 for a predetermined charging time (S03).

The controller 21 determines the charging facilities 40 to display based on various conditions (S04). The various conditions may include conditions related to any one or more of the predicted value of the recovery amount of the state of charge; the positional relationships among the vehicle 10, the road Rd, and the charging facilities 40; the road structure; and the availability of the charging facilities 40 to the user. Step S04 may be performed before step S03.

The controller 21 varies the display form of the charging facilities 40, displayed on the map image on the display 27, according to the predicted value of the recovery amount of the state of charge (S05).

In this way, a plurality of charging facilities 40 are displayed in different manners according to the predicted value of the recovery amount of the state of charge, thereby enabling the user easily to select a charging facility 40 from the display 27. By the user selecting the charging facility 40, the guidance apparatus 20 may guide the vehicle 10 to the selected charging facility 40 using, for example, the functions of a navigation system.

Additionally, the present disclosure is not limited to the above embodiment, and various modifications and revisions may be implemented. For example, functions or the like included in each component, each step, or the like can be rearranged without logical inconsistency, and a plurality of components, steps, or the like can be combined into one or divided.

For example, in the above embodiment, the server 30 collects information on the charging facilities 40 and determines the charging facilities 40 to be displayed by the guidance apparatus 20 and their display form. However, the server 30 and the guidance apparatus 20 can share functions in any form. For example, the server controller 31 of the server 30 may perform some of the processing performed by the controller 21 of the guidance apparatus 20. In some embodiments, the server 30 may be omitted and the guidance apparatus 20 may collect information on the charging facilities 40 and store this information in the memory 23.

Examples of some embodiments of the present disclosure are described below. However, it should be noted that the embodiments of the present disclosure are not limited to these examples.

Appendix 1

A guidance apparatus for guidance to a charging facility, the guidance apparatus comprising:

- a positional information acquisition interface configured to acquire information on a current position of a mobile object;
- a display configured to display the charging facility; and
- a controller configured to extract a charging facility located within an area based on the current position, predict a recovery amount of a state of charge of a battery of the mobile object, expressed as a charging rate relative to a full charge of the battery, in a case in which the battery is charged at the charging facility for a predetermined charging time, and vary a display form of the charging facility displayed on the display, according to a predicted value of the recovery amount of the state of charge.

Appendix 2

In the guidance apparatus according to appendix 1, the display may be configured to display the charging facility on a map image and vary the display form of the charging facility displayed on the map image.

Appendix 3

The guidance apparatus according to claim 1 may further comprise an input interface configured to enable a user of the mobile object to set the predetermined charging time.

Appendix 4

In the guidance apparatus according to appendix 1, the controller may be configured to acquire information on an upper limit of charging time set at the charging facility and to set the upper limit of the charging time as the predetermined charging time.

Appendix 5

In the guidance apparatus according to any one of appendices 1 to 4, the controller may be configured to cause the display to display the charging facility as an icon.

Appendix 6

In the guidance apparatus according to appendix 5, the controller may be configured to change a color of the icon based on the predicted value of the recovery amount.

Appendix 7

In the guidance apparatus according to any one of appendices 1 to 6, the controller may be configured to guide the mobile object to a charging facility located within a predetermined range from the current position of the mobile object.

Appendix 8

In the guidance apparatus according to any one of appendices 1 to 7, the controller may be configured to set a priority for the charging facility based on the current position of the mobile object and a positional relationship with a road on which the mobile object is traveling, and to cause the display preferentially to display a charging facility for which the priority is higher.

Appendix 9

In the guidance apparatus according to appendix 8, the controller may be configured to set the priority higher for a charging facility located in a direction of travel of the mobile object on a traffic division side on which the mobile object is traveling.

Appendix 10

In the guidance apparatus according to appendix 8 or 9, the controller may be configured to acquire information on a road structure of a road on which the mobile object is traveling and determine the priority according to the information on the road structure.

Appendix 11

In the guidance apparatus according to any one of appendices 8 to 10, the controller may be configured to acquire traffic information on a road on which the mobile object is traveling and determine the priority according to the traffic information.

Appendix 12

In the guidance apparatus according to any one of appendices 1 to 11, the controller may be configured to cause the display to display the charging facility only in a case in which the predicted value of the recovery amount is equal to or greater than a predetermined value.

Appendix 13

In the guidance apparatus according to any one of appendices 1 to 12, the controller may be configured to predict the recovery amount of the state of charge of the battery taking into account power consumption for travel of the mobile object from the current position to the charging facility.

Appendix 14

In the guidance apparatus according to any one of appendices 1 to 13, the controller may be configured to extract the charging facility only in a case in which the charging facility is available to the mobile object.

Appendix 15

In the guidance apparatus according to any one of appendices 1 to 14, the controller may be configured to confirm whether a charging standard of the charging facility conforms to a charging standard of the mobile object and to cause the display to display the charging facility only in a case in which the charging standard of the charging facility conforms.

Appendix 16

In the guidance apparatus according to any one of appendices 1 to 15, the controller may be configured to confirm whether a payment method available to a user of the mobile object is available for payment at the charging facility and to cause the display to display the charging facility only in a case in which the payment method is available.

Appendix 17

A guidance method to be executed by a controller of a guidance apparatus for guidance to a charging facility, the guidance method comprising:

acquiring information on a current position of a mobile object;

extracting a charging facility located within an area based on the current position;

predicting a recovery amount of a state of charge of a battery of the mobile object, expressed as a charging rate relative to a full charge of the battery, in a case in which the battery is charged at the charging facility for a predetermined charging time; and causing a display to display the charging facility while varying a display form of the charging facility according to a predicted value of the recovery amount of the state of charge.

Appendix 18

The guidance method according to appendix 17, the predetermined charging time may be set by a user of the mobile object via an input interface.

Appendix 19

In the guidance method according to appendix 17 or 18, the controller may be configured to acquire information on an upper limit of charging time set at the charging facility and to set the upper limit of the charging time as the predetermined charging time.

Appendix 20

A program according to an embodiment of the present disclosure is configured to cause a computer to execute processing, the processing comprising:

acquiring information on a current position of a mobile object;

extracting a charging facility located within an area based on the current position;

predicting a recovery amount of a state of charge of a battery of the mobile object, expressed as a charging rate relative to a full charge of the battery, in a case in which the battery is charged at the charging facility for a predetermined charging time; and causing a display to display the charging facility while varying a display form of the charging facility according to a predicted value of the recovery amount of the state of charge.

The invention claimed is:

1. A guidance apparatus for guidance to a charging facility, the guidance apparatus comprising:

a positional information acquisition interface configured to acquire information on a current position of a mobile object;

a display configured to display the charging facility; and a controller configured to extract a charging facility located within an area based on the current position, predict a recovery amount of a state of charge of a battery of the mobile object, expressed as a charging rate relative to a full charge of the battery, in a case in which the battery is charged at the charging facility for a predetermined charging time, and vary a display form of the charging facility displayed on the display, according to a predicted value of the recovery amount of the state of charge, wherein varying the display form of the charging facility includes varying display colors of the charging facility in accordance with one or more categories.

2. The guidance apparatus according to claim 1, wherein the display is configured to display the charging facility on a map image and vary the display form of the charging facility displayed on the map image.

3. The guidance apparatus according to claim 1, further comprising an input interface configured to enable a user of the mobile object to set the predetermined charging time.

4. The guidance apparatus according to claim 1, wherein the controller is configured to acquire information on an upper limit of charging time set at the charging facility and to set the upper limit of the charging time as the predetermined charging time.

5. The guidance apparatus according to claim 1, wherein the controller is configured to cause the display to display the charging facility as an icon.

6. The guidance apparatus according to claim 5, wherein the controller is configured to change a color of the icon based on the predicted value of the recovery amount.

7. The guidance apparatus according to claim 1, wherein the controller is configured to guide the mobile object to a charging facility located within a predetermined range from the current position of the mobile object.

8. The guidance apparatus according to claim 1, wherein the controller is configured to set a priority for the charging facility based on the current position of the mobile object and a positional relationship with a road on which the mobile object is traveling, and to cause the display preferentially to display a charging facility for which the priority is higher.

9. The guidance apparatus according to claim 8, wherein the controller is configured to set the priority higher for a charging facility located in a direction of travel of the mobile object on a traffic division side on which the mobile object is traveling.

10. The guidance apparatus according to claim 8, wherein the controller is configured to acquire information on a road structure of a road on which the mobile object is traveling and determine the priority according to the information on the road structure.

11. The guidance apparatus according to claim 8, wherein the controller is configured to acquire traffic information on a road on which the mobile object is traveling and determine the priority according to the traffic information.

12. The guidance apparatus according to claim 1, wherein the controller is configured to cause the display to display the charging facility only in a case in which the predicted value of the recovery amount is equal to or greater than a predetermined value.

13. The guidance apparatus according to claim 1, wherein the controller is configured to predict the recovery amount of the state of charge of the battery taking into account power consumption for travel of the mobile object from the current position to the charging facility.

14. The guidance apparatus according to claim 1, wherein the controller is configured to extract the charging facility only in a case in which the charging facility is available to the mobile object.

15. The guidance apparatus according to claim 1, wherein the controller is configured to confirm whether a charging standard of the charging facility conforms to a charging standard of the mobile object and to cause the display to display the charging facility only in a case in which the charging standard of the charging facility conforms.

16. The guidance apparatus according to claim 1, wherein the controller is configured to confirm whether a payment method available to a user of the mobile object is available for payment at the charging facility and to cause the display to display the charging facility only in a case in which the payment method is available.

17. A guidance method to be executed by a controller of a guidance apparatus for guidance to a charging facility, the guidance method comprising:

acquiring information on a current position of a mobile object;

extracting a charging facility located within an area based on the current position;

predicting a recovery amount of a state of charge of a battery of the mobile object, expressed as a charging rate relative to a full charge of the battery, in a case in which the battery is charged at the charging facility for a predetermined charging time; and causing a display to display the charging facility while varying a display form of the charging facility according to a predicted value of the recovery amount of the state of charge, wherein varying the display form of the charging facility includes varying display colors of the charging facility in accordance with one or more categories.

18. The guidance method according to claim 17, wherein the predetermined charging time is set by a user of the mobile object via an input interface.

19. The guidance method according to claim 17, wherein the controller is configured to acquire information on an upper limit of charging time set at the charging facility and to set the upper limit of the charging time as the predetermined charging time.

20. A non-transitory computer readable medium storing a program configured to cause a computer to execute processing, the processing comprising:

acquiring information on a current position of a mobile object;

extracting a charging facility located within an area based on the current position;

predicting a recovery amount of a state of charge of a battery of the mobile object, expressed as a charging rate relative to a full charge of the battery, in a case in which the battery is charged at the charging facility for a predetermined charging time; and causing a display to display the charging facility while varying a display form of the charging facility according to a predicted value of the recovery amount of the state of charge, wherein varying the display form of the charging facility includes varying display colors of the charging facility in accordance with one or more categories.

* * * * *